Patented Dec. 5, 1950

2,533,098

UNITED STATES PATENT OFFICE 2,533,098

NUCLEAR HALOGENATION OF THIOPHENE

Lawrence W. Devaney, Fishkill, N. Y., assignor to The Texas Company, New York, N. Y., a corporation of Delaware No Drawing. Application August 22, 1946, Serial No. 692,387

6 Claims. (Cl. 260—329)

This invention relates to a continuous process for the production of nuclear halogenated thiophene derivatives and particularly to an improved process for the production of mono and di-halogenated thiophene compounds.

The preparation of halogenated thiophene derivatives has in the past been largely restricted to small scale laboratory preparations, conducted primarily for purposes of academic investigations where the economics of the reaction and the yields of the process were of no considerable import. For the preparation of chloro-thiophenes the most widely accepted method is the reaction of sulfuryl chloride and thiophene in the presence of aluminum chloride. Batchwise chlorination of thiophene with chlorine has also been reported, but this method has not been found satisfactory for the production of the individual chloro-derivatives since polychlorination and the formation of hydrogen chloride complexes predominate in the reaction.

Contrary to the experiences of the prior investigators it has now been found possible to produce mono and di-halogenated thiophene derivatives in substantial yields by direct halogenation as well as provide a continuous process for the nuclear halogenation of thiophene and its compounds which is economically suited to commercial operation. It has now been discovered that the nuclear halogenation of thiophene compounds can be controlled and excessive polyhalogenation and complex formation minimized by restricting the contact time of the reactants to certain defined limits and withdrawing the halo-derivatives from the reaction zone substantially as they are formed. The present invention is accordingly directed to a continuous nuclear halogenation process in which a halogen such as chlorine or bromine and a thiophene compound containing at least two reactive nuclear hydrogen atoms are continuously and simultaneously brought into contact within a reaction zone at a liquid feed rate of at least 0.5 liters of thiophene reactant per hour per liter of reactor volume and the resulting halo-derivatives continuously withdrawn from the reaction zone. This process may be conducted either in the liquid or vapor phase but the preferred procedure is in the liquid phase using a liquid thiophene reactant and gaseous chlorine at substantially atmospheric temperature.

The process of the invention is especially adapted to the production of mono and di-halogenated thiophene derivatives and particularly the mono and di-chloro derivatives to the substantial exclusion of the higher polychlorinated products. In this preferred embodiment the reaction should be conducted at a liquid feed rate within the range of 0.5 to 20 liters of thiophene reactant per hour per liter of reactor volume (l./hr./l.) and a mol ratio of thiophene reactant to halogen of at least 2.

The thiophene compounds which may be employed in this process include any thiophene compound possessing at least two reactive nuclear hydrogen atoms such as thiophene itself or the mono- and di-substituted thiophene derivatives but the preferred thiophene charge would be thiophene itself or a mono-alkyl thiophene such as 2-methylthiophene, 3-methylthiophene, 2-ethylthiophene, etc. While both chlorine and bromine can be used in this process, chlorine is more reactive and permits the use of greater throughput rates in order to obtain equivalent proportions of the halo-derivatives. As a general proposition the bromination reactions will involve a slower feed rate and a higher mol ratio than the corresponding chlorination reaction. In the chlorination of thiophene itself for the production of mono and di-chlorothiophene, the optimum conditions of reaction have been obtained at a feed rate of 2.0 to 8.0 l./hr./l. and mol ratios of 3.0 to 5.0. Higher mol ratios may of course be employed but these would merely necessitate the fractionation of large quantities of product containing unreacted thiophene in order to recover the desired chloro-derivatives.

The process may be conducted in any suitable reactor which can withstand the corrosive action of chlorine or bromine and their respective hydrohalides. An important advantage of the process is that a light source is not required to effect the halogenation reaction and accordingly places no limitations on the type of reactor employed. Thus, the reactor may be fabricated either of glass or a non-corrosive metal such as stainless steel. The shape of the reactor is not important but as a matter of convenience and efficiency of reaction a cylindrical reactor is desirable. The liquid thiophene reactant and the halogen are introduced separately into the bottom of the reactor, the gaseous halogen being preferably introduced through a perforated disc or other means to facilitate dispersion, and the liquid product drawn off at the top of the reactor and fractionated to recover the respective halo-derivatives. Any gaseous products such as the hydrohalides are taken overhead and passed to a water scrubber.

By virtue of the exothermic nature of the halogenation reaction a temperature rise is to be expected in the reactor, particularly at the higher feed rates. Accordingly, when operating at the high feed rates it may be desirable to incorporate inert diluents with the reactants to provide a more effective control of the heat of reaction and prevent vaporization loss of the thiophene reactant. Examples of inert diluents which may be used with the thiophene reactant include carbon tetrachloride, benzene, etc., and inert gases such as nitrogen with the halogen charge.

In order that the invention may be fully understood, reference is made to the following specific examples which illustrate the preferred embodiment of the invention as practiced in liquid phase operations. It is to be understood that these examples are presented for illustrative purposes only and are not intended as limitations of the invention.

*Example I*

Liquid thiophene and gaseous chlorine were continuously and simultaneously introduced into the bottom of a reactor consisting of a glass tube about 1″ in diameter and having a volume to the outlet of approximately 150 cc. The thiophene feed rate was 1450 cc. per hour and 5.6 mols of thiophene per mol of chlorine was employed. The liquid product was continuously withdrawn and fractionally distilled. The yield of 2-chlorothiophene, boiling point 127° C., represented 60.0 mol per cent basis the chlorine charge or 78 mol per cent based upon the thiophene consumed while the yield of 2,5-dichlorothiophene, boiling point 161° C., was 24.7 mol per cent basis the chlorine charged and 16 mol per cent basis the thiophene consumed. The residual amounts of chlorine formed higher polychlorothiophenes and hydrogen chloride addition complexes.

*Example II*

Thiophene and chlorine were continuously introduced into the bottom of a glass tube of about 1¼″ in diameter and having a volume to the outlet of approximately 530 cc. The thiophene feed rate was 3000 cc. per hour with a mol ratio of thiophene to chlorine of 5.4. The 2-chlorothiophene yield was 85 mol per cent based on the thiophene consumed while the 2,5-dichlorothiophene yield was 7 mol per cent based on thiophene consumed.

*Example III*

Thiophene and bromine were continuously charged to the reactor of Example II with a thiophene feed rate of 1730 cc. per hour and 18.6 mols of thiophene per mol of bromine. The liquid product was fractionally distilled and the yield of 2-bromothiophene and 2,5-di-bromothiophene represented 16.7 mol per cent and 15.0 mol per cent respectively based on the bromine charged.

Obviously many modifications and variations of the invention as hereinbefore set forth may be made without departing from the spirit and scope thereof and, therefor, only such limitations should be imposed as are indicated in the appended claims.

I claim:

1. A continuous process for the production of mainly nuclear mono-halogenated thiophene compounds which comprises continuously introducing a gaseous halogen and a liquid thiophene compound containing at least two reactive nuclear hydrogen atoms at a mol ratio of thiophene compound to halogen of at least 2 into contact with one another in a reaction zone at a liquid feed rate of 0.5 to 20 liters of thiophene reactant per hour per liter of reactor volume, reacting said halogen and thiophene compound in the liquid phase and continuously withdrawing the liquid halogenated product from reaction zone.

2. A process for the production of nuclear mono-halogenated thiophene derivatives which comprises introducing a halogen and a thiophene compound containing at least 2 nuclear hydrogen atoms at a mol ratio of thiophene compound to halogen of at least 2 into a reaction zone at a liquid feed rate of 0.5 to 20 liters of thiophene reactant per hour per liter of reactor volume, reacting said halogen and thiophene compound in the liquid phase and continuously withdrawing the resulting halogenated product comprising mainly nuclear mono-halgenated thiophene from the reaction zone.

3. A process for the production of nuclear mono-chlorinated thiophene derivatives which comprises introducing chlorine and a thiophene compound containing at least 2 nuclear hydrogen atoms at a mol ratio of thiophene compound to chlorine of at least 2 into a reaction zone at a liquid feed rate of 0.5 to 20 liters of thiophene reactant per hour per liter of reactor volume, reacting said chlorine and thiophene compound in the liquid phase and continuously withdrawing the resulting chlorinated product comprising mainly nuclear mono-chlorinated thiophene compounds from the reaction zone.

4. A process according to claim 3 in which thiophene is the reactant.

5. A process for the production of nuclear mono-halogenated thiophene which comprises introducing a halogen and thiophene at a mol ratio of thiophene to halogen of at least 2 into a reaction zone at a liquid feed rate of 0.5 to 20 liters of thiophene per hour per liter of reactor volume, reacting said halogen and thiophene in the liquid phase and continuously withdrawing the resulting halogenated product comprising mainly monohalogenated thiophene from the reaction zone.

6. A process for preparing 2-chlorothiophene which comprises introducing chlorine and thiophene in a mol ratio of thiophene to chlorine of at least 2 into a reaction zone at a liquid feed rate of 0.5 to 20 liters of thiophene per hour per liter of reactor volume, reacting said chlorine and thiophene in the liquid phase and continuously withdrawing 2-chlorothiophene from said reaction zone.

LAWRENCE W. DEVANEY.

REFERENCES CITED

The following references are of record in the file of this patent:

UNITED STATES PATENTS

| Number | Name | Date |
| --- | --- | --- |
| 2,395,777 | Brunjes et al. | Feb. 26, 1946 |

OTHER REFERENCES

Bernthsen and Sudborough: "Organic Chemistry," Van Nostrand, N. Y., 1925 (1922 edition), page 549.

Beilstein, vol. 17, pages 32–35 (1933).

Richter: "Organic Chemistry," Wiley, N. Y., 1938, pages 649–650.

Steinkopf: "Die Chemie des Thiophens," Edwards Lithoprint of 1941, copyright, pages 19, 35.

Morton: "The Chemistry of Heterocyclic Compounds," pages 42 and 43. McGraw-Hill, 1946.

Groggins: "Unit Processes in Organic Synthesis," Ed. 3, McGraw-Hill, N. Y., 1947, pages 200–201.